United States Patent [19]

Wigoda

[11] E Patent Number: Re. 32,842

[45] Reissued Date of Patent: Jan. 24, 1989

[54] ARBITRATION OF TENNIS BY CHANGE OF COLORS

[76] Inventor: Lois L. Wigoda, 345 North Shore Dr., Maimi Beach, Fla. 33141

[21] Appl. No.: 99,163

[22] Filed: Aug. 25, 1987

Related U.S. Patent Documents

Reissue of:

[64] Patent No.: 4,538,811
Issued: Sep. 3, 1985
Appl. No.: 457,933
Filed: Mar. 7, 1983

[51] Int. Cl.[4] ..... A63C 19/06

[52] U.S. Cl. ..... 273/31

[58] Field of Search ..... 273/31, 181 R, 181 J, 273/181 K, 240, 183 R, 184 R, 378, 186 D, 186 A, 269; 434/410, 327, 329, 346; 40/448, 446, 447

[56] References Cited

U.S. PATENT DOCUMENTS

| | | | |
|---|---|---|---|
| 3,863,386 | 2/1975 | Kinberg | 434/410 |
| 3,943,643 | 3/1976 | Fisher et al. | 434/410 |
| 4,011,665 | 3/1977 | Port | 434/410 |
| 4,051,609 | 10/1977 | Boursaw | 434/410 |
| 4,133,536 | 1/1979 | Cole | 434/410 |
| 4,212,468 | 7/1980 | Knott | 273/240 |
| 4,288,936 | 9/1981 | Okutsu | 434/409 |
| 4,354,845 | 10/1982 | Poteet | 273/269 |

*Primary Examiner*—Richard C. Pinkham
*Assistant Examiner*—T. Brown
*Attorney, Agent, or Firm*—Harry W. Barron

[57] ABSTRACT

Disclosed herein is apparatus to precisely determine if a tennis ball hits in or out of the tennis court area. A pressure sensitive layered material which changes colors upon the tennis ball striking it is placed outside the tennis court bounderies and gives an indication whenever the ball strikes out of bounds. The material returns to its original color a short time later.

1 Claim, 1 Drawing Sheet

ARBITRATION OF TENNIS BY CHANGE OF COLORS

Matter enclosed in heavy brackets [ ] appears in the original patent but forms no part of this reissue specification; matter printed in italics indicates the additions made by reissue.

The purpose of this invention is to avoid controversy at the tennis courts, when there is a disagreement among players as where the tennis ball touched, that is, if it is inside or outside the lines.

The invention consists of a contrast of colors between two layers of different coloring. The bottom one is of a darker shade (preferably black). The layer above is a flexible transparent chamber that contains a high consistency fluid of oily type, colored and non dryable. This fluid will move freely in the flexible transparent chamber or bag which is of one millimeter or more of thickness. This fluid remains inside and is limited to the chamber.

Above the chamber there will be a strong transparent slightly flexible material, made of plastic or any other material that will stand the heavy tear and wear of a tennis court. All these layers will be placed along the tennis court lines. They could be placed on the surface or "built in" under the level of the tennis court surface, as long as they are built in a manner that does not interfere with the game.

The transparent cover and the flexible transparent chamber will have a slight flexibility, allowing the inside fluid in the chamber to be displaced at touch. When displaced, the darker bottom color will appear, giving a combination of colors, which will give a momentary impression to the eye, as where the ball hit.

Figure 1:
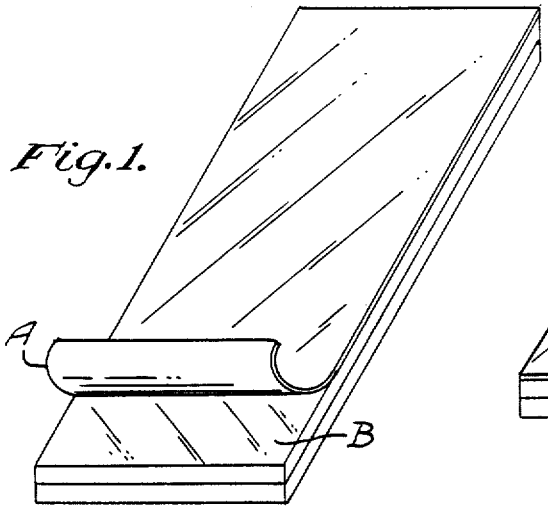
FIG. 1 and FIG. 2 show three layers. Letter A. A transparent flexible strong material covering the invention. Letter B. A flexible transparent chamber, filled with oily consistency type of fluid, non dryable and displacable at touch.
Figure 2:
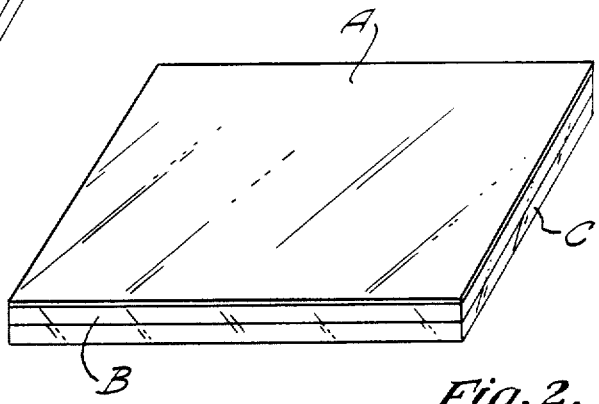
Figure 3:
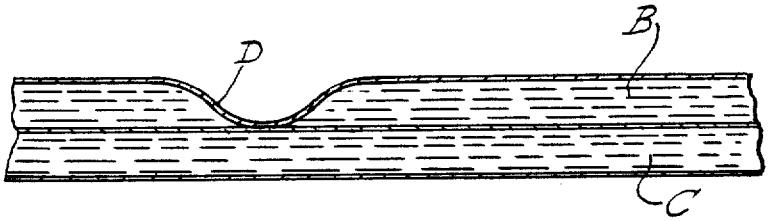
FIGS. 3 and 4 show where the ball hit.
Figure 4:
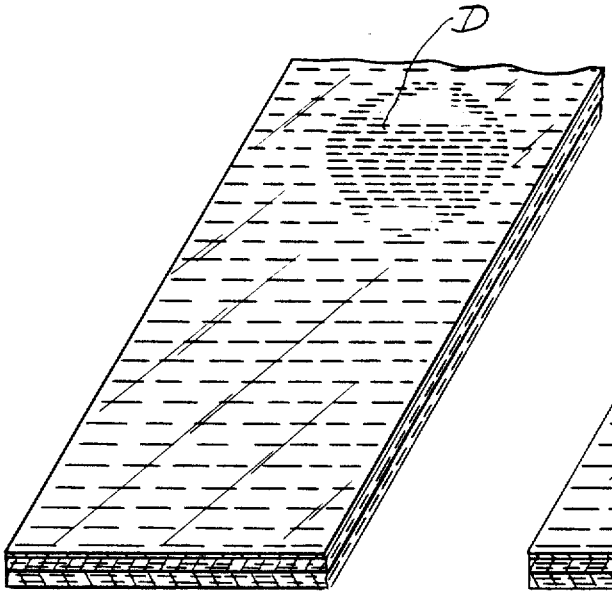
Figure 5:
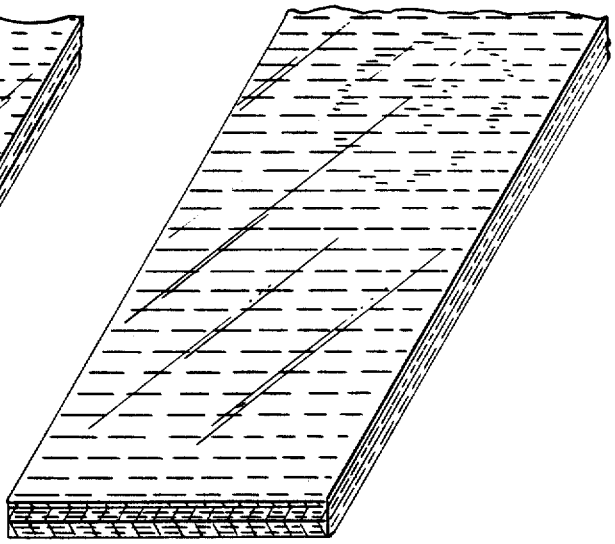
FIG. 5 shows the disappearance of the impression left by the ball a few moments later.

The invention consists of a combination of different layers of colors, which gives a change of color at touch. The middle layer fluid is displaced momentarily, therefore allowing the darker bottom layer (C) of paint to appear, leaving no doubt where the tennis ball hit. It reverses a few seconds later.

A transparent flexible chamber B of one millimeter or more in thickness, which contains a high density fluid of oily consistency, colored, easily displacable, non dryable which may be of one or different tones or colors. When applying pressure, or at touch over the surface of this area, the fluid will move momentarily, leaving a mark of a different color, nevertheless, it will return to the original color a few seconds later.

The bottom area (C) will be of a dark color preferably black, this color will make a contrast with the transparent flexible chamber (B) containing the oily fluid.

The top layer (A) which can be built as part of the middle chamber will be transparent, slightly flexible, it could be made of plastic or any other material that will give a strong resistance for heavy wear and tear.

This invention could be placed along the lines of the tennis court, in or outside, preferably out. It could go on the surface or "built-in" up to the level of the tennis court.

I claim:

1. A tennis ball contact indicator in combination with a tennis court comprising:

a thin rectilinear conduit having a transparent and flexible top layer and a bottom layer of one color;

said top layer including a tear and wear resistant material in the form of a rectilinear line;

a [high density] fluid having a color different from said one color and being flowable upon movement of said top layer;

said top layer and bottom layer being separated [by one millimeter or more]; and said conduit being affixed to said tennis court to define the boundary thereof and said top layer being movable towards said bottom layer to momentarily displace said fluid and expose said one color upon impact of a tennis ball with said top layer to indicate out of bounds of a tennis ball during play.

* * * * *